United States Patent [19]

Torres

[11] Patent Number: 5,368,337
[45] Date of Patent: Nov. 29, 1994

[54] ADJUSTABLE STABILIZER CLAMP

[76] Inventor: Santos Torres, 25490 Coral Tree Ct., Murrieta, Calif. 92562

[21] Appl. No.: 174,226

[22] Filed: Dec. 28, 1993

[51] Int. Cl.$^5$ .............................................. F16L 35/00
[52] U.S. Cl. ................... 285/114; 285/318; 285/81; 285/253
[58] Field of Search ................... 285/114, 318, 253, 81

[56] References Cited

U.S. PATENT DOCUMENTS

| 3,249,370 | 5/1966 | Brogden | 285/114 |
|---|---|---|---|
| 3,295,548 | 1/1967 | Woods | 285/114 |
| 3,881,753 | 5/1975 | Bochory | 285/114 |
| 4,055,359 | 10/1977 | McWetny | 285/318 |
| 4,093,282 | 6/1978 | Kyriakodis | 285/114 |
| 4,109,941 | 8/1978 | Wood et al. | 285/114 |
| 4,750,762 | 6/1988 | Corzine | 285/318 |
| 4,796,925 | 1/1989 | Zwicker | 285/114 |
| 4,913,468 | 4/1990 | Rattmann | 285/114 |
| 5,002,314 | 3/1991 | Smith | 285/318 |
| 5,112,085 | 5/1992 | Busch et al. | 285/318 |

FOREIGN PATENT DOCUMENTS

| 2600226 | 7/1977 | Germany | 285/253 |
|---|---|---|---|
| 2655073 | 6/1978 | Germany | 285/114 |
| 403414 | 6/1966 | Switzerland | 285/114 |
| 2205137 | 11/1988 | United Kingdom | 285/114 |

Primary Examiner—Eric K. Nicholson
Attorney, Agent, or Firm—Merchant, Gould, Smith, Edell, Welter & Schmidt

[57] ABSTRACT

An adjustable stabilizer clamp for securing a connection between a push-on pipe fitting and a pipe used in fluid lines. The clamp has a stainless steel stabilizer bar that has a fitted groove for receiving a donut or a cage of a pipe. The stabilizer bar has two circle clamps located at each arm of the stabilizer bar for support. The circle clamps are radially secured onto the pipe. Thus, the clamp prevents pipe movement, pipe vibrations, or high line pressures from causing the push-on pipe fitting from failing and leaking dangerous CFC's into the ozone.

7 Claims, 2 Drawing Sheets

ADJUSTABLE STABILIZER CLAMP

BACKGROUND OF THE INVENTION

1. Field of the Invention

This invention relates in general to an adjustable stabilizer clamp for fluid line couplings, and in particular, to an adjustable stabilizer clamp for use with fluid line couplings employing push-on fittings.

2. Description of Related Art.

Couplings for fluid lines typically comprise two pipes, one with a push-on fitting and another with integrated O-rings. The push-on fitting pipe also has a flange at the end. Further, the other pipe has a donut shell or cage with a garter-type coil spring enclosed within the donut or cage near the end for receiving the flanged end of the push-on fitting. One example of such a push-on coupling for a fluid line is shown in U.S. Pat. No. 4,055,359, assigned to Ford Motor Company, which patent is incorporated by reference herein. The push-on fitting of the Ford coupling has an end that is flared and sized to fit into a cage that houses a garter-type coiled spring. The fitting is pushed onto the pipe and over the O-rings on the end of the pipe. When the flared end of the fitting enters the cage, the spring is forced over the flared end of the pipe and down to encircle the fitting. The fitting is thus prevented by the spring from being pulled out of the cage. Pressurized fluid between the pipe and the push-on fitting is sealed within the line by the O-rings.

The push-on fittings are used, for example, in air conditioning systems to connect flexible hoses to the condenser, evaporator, accumulator and the compressor. Also, the push-on couplings can be used for connecting the gasoline tank to the carburetor of the vehicle. The Ford coupling is typically used for vehicle air conditioning fluid lines and fuel lines. Thus, since dangerous ozone depleting CFC's are contained within air conditioning lines, push-on couplings between the lines must be secure and should not leak. However, Ford's coupling has a history of problems.

For example, the push-on couplings have a high incidence of failure in the O-rings used to seal the connection between the push-on fitting and the pipe to which it is coupled. Further, the line pressure of the fluid lines of a vehicle's air conditioning system conventionally operates at least 100 p.s.i. However, line pressures of 300 p.s.i. are not uncommon at high ambient temperatures. Thus, severe strain is placed upon the seal between the push-on fitting and the pipe by these high pressures. Consequently, high line pressures cause a high incidence of O-ring failures. Further, the running of the vehicle's engine causes constant vibration and movement of the flexible hose. Thus, the fitting moves back and forth transverse to its axis, causing wear and eventual rupture of the seal between the O-rings and the inner surface of the push-on fitting. Therefore, when the push-on coupling fails, dangerous CFC's escape from the fluid lines and cause serious damage to the ozone.

The locking assembly shown and described in U.S. Pat. No. 4,750,762 attempted to solve this problem. U.S. Pat. No. 4,750,762 comprises two halves of an axially split clamp containing a semi-annular recess to fit over the cage housing, and the coiled spring of the pipe. Also, the locking assembly has an adjacent semi-circular surface having the same diameter as the outer surface of the push-on fitting adjacent the cage. The two halves of the clamp each have a pair of aligned threaded holes for joining the two halves together.

However, the above mentioned reference contains a two part clamping mechanism secured by axial forces and only two fasteners. Because the push-on coupling is radially shaped and since the above referenced clamp applies only axial forces and only at two locations, it cannot secure the radial shaped push-on coupling as uniformly and securely as the radial fastener in the present invention.

The clamp in the present invention is designed so that radial forces are applied uniformly around the entire push-on coupling. Thus, the clamp of the present invention will not allow the push-on coupling to leak because the clamp is always secured uniformly to the coupling. However, the coupling of the above reference will leak over a period of time because each fastener can loosen separately, thus causing non-uniform pressure on the coupling and the creation of a leak.

Also, the above mentioned reference contains many parts and must be precisely manufactured. However, the present invention is a one piece part and is easy to manufacture and install.

Further, the clamp in the present invention is universal and can be adjusted to fit any pipe diameter. However, the above mentioned reference is not universal and can be only manufactured for only a specific pipe diameter. Each clamp of the above mentioned reference cannot be fitted to a variety of pipe diameters and a separate clamp must be custom made for each different pipe size.

Whatever the merits of the prior clamps, they do not achieve the benefits of the present invention.

SUMMARY OF THE INVENTION

To overcome the limitations in the prior art described above, and to overcome other limitations that will become apparent upon reading and understanding the present specification, the present invention discloses an adjustable stabilized clamp for fluid line couplings, wherein the clamp is placed around the push-on coupling arrangement between the line and the push-on fitting. The clamp of the present invention prevents engine vibration and vehicle movement from eventually rupturing the seals of the push-on coupling. Ruptured seals are undesirable because they can result in leakage of dangerous CFC's into the ozone. The clamp uniformly urges the push-on coupling together and holds the push-on fitting into concentric alignment with the pipe to which the fitting is coupled to. In addition, a uniform radial force is directed on the seal between the O-rings and the inner surface of the fitting to maximize the O-ring seal.

The clamp of the present invention has a stainless steel stabilizer bar having a fitted grove for receiving the cage of the pipe. The stabilizer bar has two circle clamps located at each arm of the stabilizer bar for support. The circle clamps are radially secured onto the pipe.

The centered fitted grove is placed over the cage of the pipe and the two circle clamps are radially encircled over the pipe. This arrangement ensures that the pipe is secured by uniform radial forces thereby locking the pipe and fitting into concentric alignment. This uniform radial clamping system improves the sealing of couplings utilizing push-on fittings.

BRIEF DESCRIPTION OF THE DRAWING

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
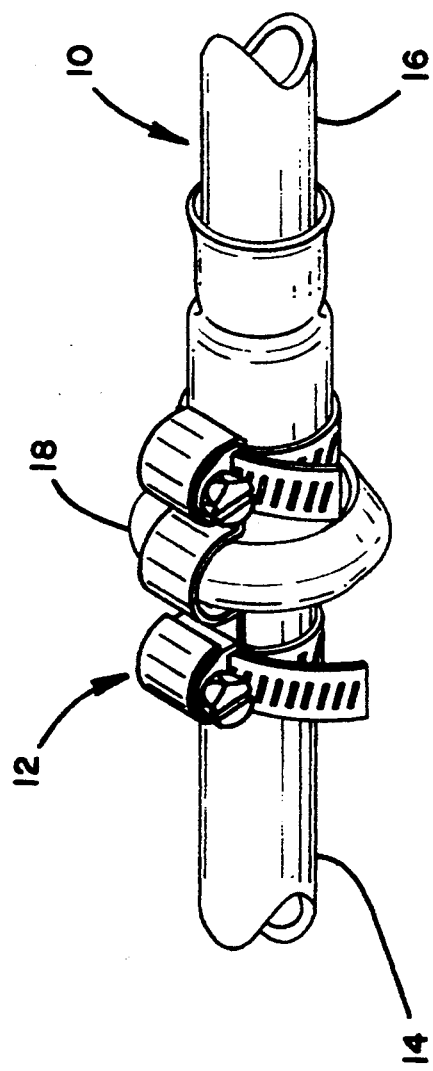
FIG. 1 is a perspective view showing the clamp of the present invention securing a push-on coupling.

FIG. 1 illustrates a push-on coupling 10 having an adjustable stabilizer clamp 12 thereon to prevent the coupling 10 from separating due to vibration or other movements. The coupling 10 is further illustrated in U.S. Pat. No. 4,055,359, and is used extensively by the Ford Motor Company on vehicle refrigerant lines and fuel lines. The push-on coupling 10 includes a pipe 14 and a push-on fitting pipe 16. Both pipes 14 and 16 can have varying diameters depending on the application and vehicle. Pipe 14 has a cage 18 near the coupled section where the two pipes 14 and 16 are connected.

Continual transverse movement between pipe 14 and pipe 16 due to engine vibration and temperature changes tend to cause the failure of the push-on coupling 10. However, the adjustable stabilizer clamp 12 securely clamps and fastens the cage 18 and pipes 14 and 15 together. When the clamp 12 is secured to the push-on coupling 10, it prevents the failure or separation of the push-on coupling 10 under the above recited circumstances.

Figure 2:
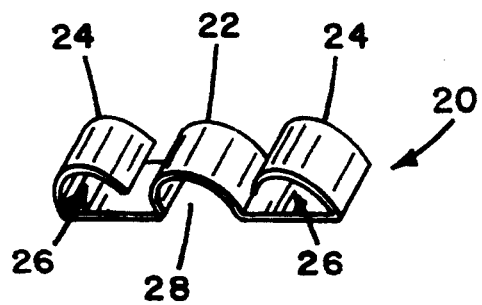
FIG. 2 is a perspective view showing the stabilizer bar.

FIG. 2 illustrates the stabilizer arm 20 of the adjustable stabilizer clamp 12. The stabilizer bar 20 has a fitted groove 22 centered between two arms 24, wherein the arms 24 are preferably equidistantly spaced apart from each other. Each arm 24 has a semi-annular recess 26. The groove 22 also has a semi-annular recess 28, which is shaped and sized to fit snugly over the pipe cage 18 of FIG. 1. It is preferred that stabilizer bar 20 be stainless steel, although other materials could be used as well.

Figure 3:
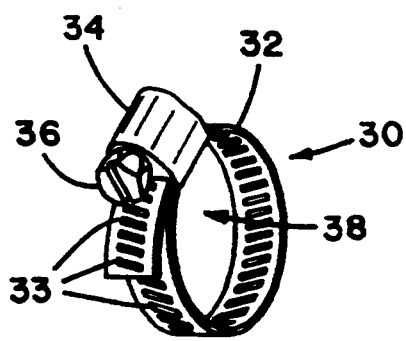
FIG. 3 is a perspective view of the circle clamp.

FIG. 3 illustrates the circle clamp 30 of the adjustable stabilizer clamp 12 of FIG. 1. The circle clamp 30 has a band 32 and a head 34 coupled to band 32. The band 32 has slots 33 throughout and the head 34 has an integrated adjusting mechanism 36. The adjusting mechanism 36 is typically a screw 36 having threads (not shown). The threads of the screw 36 are geared to the slots 33 of the band 32. Thus, when the screw 36 is turned, the threads of the screw 36 mesh into the slots 33 to traverse the band 32 thereby allowing the diameter 38 of the band 32 to be adjusted. Therefore, the band 32 can be tightened and loosened radially on the coupling 10 and also can be fitted to any pipe diameter, such as pipe 14 and 16 of FIG. 1.

Figure 4:
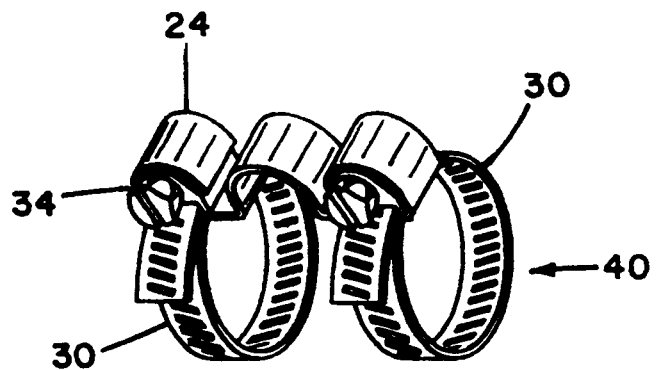
FIG. 4 is a perspective view of the interaction between the stabilizer bar and two circle clamps.

FIG. 4 illustrates the interaction between the stabilizer bar 20 and the two circle clamps 30. The head 34 of the circle clamp 30 in FIG. 3 is semi-annularly shaped to receive the semi-annular recess 26 of FIG. 2. The semi-annular recess 26 of FIG. 2 is shaped and sized to fit snugly over the head 34. The clamp 12 receives push-on coupling 10 of FIG. 1 by encircling pipe 14 and 16 with circle clamps 30. Next, the respective adjusting mechanisms 36 of circle clamps 30 is tightened to secure circle clamps 30 around pipes 14 and 16 of FIG. 1 respectively. The tightening of the adjusting mechanism 36 forces the groove 22 of the stabilizer bar 20 to be urged securely against the cage 18 of the push-on coupling 10 of FIG. 1. Thus, the push-on coupling 10 of FIG. 1 is subject to uniform radial forces from the clamp 12, which helps prevent the failure of the push-on coupling 10.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. This concludes the description of the preferred embodiment of the invention.

What is claimed is:

1. An adjustable stabilizer clamp for fluid line couplings utilizing push-on fittings, wherein each of the couplings has a semi-circular cage extending transversely from the longitudinal axis of the hose, comprising:

a stabilizer bar having a arcuate section centered between two arms and fitted to a contour of the semi-circular cage of the coupling, wherein the arms are equidistantly spaced apart from each other; and two adjustable circle clamps, each being located at a respective arm of the stabilizer bar, for laterally and radially securing the stabilizer bar to the coupling, wherein the circle clamps uniformly and radially urge the arcuate section of the stabilizer bar into pressing engagement with the semi-circular cage of the coupling when tightened in order to secure the stabilizer bar to the coupling.

2. The invention as set forth in claim 1 above, wherein the stabilizer bar is stainless steel.

3. The invention as set forth in claim 1 above, wherein the fitted groove of the stabilizer bar further comprises a semi-annular recess shaped and sized to receive a circular cage on the coupling, and wherein each arm of the stabilizer bar further comprises a semi-annular recess shaped and sized to fit snugly over a circular head on the circle clamp.

4. An adjustable stabilizer clamp for fluid line couplings utilizing push-on fittings, wherein each of the couplings has a semi-circular cage extending transversely from the longitudinal axis of the hose, comprising:

a stabilizer bar having an arcuate section centered between two arms and defining a semi-annular recess, wherein the arms are equidistantly spaced apart from each other, and each arm has a semi-annular recess; and two adjustable circle clamps for laterally and radially securing the stabilizer bar to the coupling, each being located at a respective arm of the stabilizer bar and having a band and a head coupled to the band, wherein the band has an integrated adjusting mechanism for tightening and loosening the circle clamps on the coupling, and further wherein the bands encircle the coupling and the circle clamps urge the arcuate section of the stabilizer bar into pressing engagement with the semi-circular cage of the coupling when tightened in order to secure the coupling.

5. The invention as set forth in claim 4 above, wherein the stabilizer bar is stainless steel.

6. The invention as set forth in claim 4 above, wherein the adjusting mechanism is a screw having threads, wherein the band further comprises slots throughout, and wherein the threads of the screw are geared to the slots of the band, whereby, when the screw is turned, the threads of the screw mesh into the slots and traverse the band thereby adjusting the diameter of the band.

7. The invention as set forth in claim 4 above, wherein the semi-annular recess of the stabilizer bar is shaped and sized to receive a circular cage on the coupling, and wherein the semi-annular recess of each arm of the stabilizer bar is shaped and sized to fit snugly over a circular head on the circle clamp.

* * * * *